(12) United States Patent
Huda et al.

(10) Patent No.: US 8,524,312 B2
(45) Date of Patent: Sep. 3, 2013

(54) APPLICATOR FOR SPRAYING ELASTOMERIC MATERIALS

(75) Inventors: Faisal Huda, Oakville (CA); Christopher W. McConnery, Kitchener (CA); Christopher A. Walker, Victoria (CA); Michael F. E. Wolter, Georgetown (CA)

(73) Assignee: CSL Silicones Inc., Guelph, Ontario (CA)

( * ) Notice: Subject to any disclaimer, the term of this patent is extended or adjusted under 35 U.S.C. 154(b) by 0 days.

(21) Appl. No.: 13/297,357

(22) Filed: Nov. 16, 2011

(65) Prior Publication Data
US 2013/0122199 A1 May 16, 2013

(51) Int. Cl.
B05D 5/12 (2006.01)

(52) U.S. Cl.
USPC ....... 427/58; 427/421.1; 427/427; 427/427.4; 239/290; 239/291; 239/418

(58) Field of Classification Search
None
See application file for complete search history.

(56) References Cited

U.S. PATENT DOCUMENTS

| | | | |
|---|---|---|---|
| 1,553,709 A | 9/1925 | Murray | |
| 2,626,188 A | 1/1953 | Dalrymple | |
| 3,591,080 A | 7/1971 | Kock | |
| 3,896,994 A | 7/1975 | Walberg | |
| 3,927,833 A | * 12/1975 | Harrison et al. | 239/306 |
| 4,009,829 A | 3/1977 | Sickles | |
| 4,177,322 A | * 12/1979 | Homan et al. | 428/447 |
| 4,228,958 A | 10/1980 | Perry | |
| 4,657,184 A | 4/1987 | Weinstein | |
| 5,029,755 A | 7/1991 | Schmidt et al. | |
| 5,141,165 A | * 8/1992 | Sharpless et al. | 239/752 |
| 5,249,746 A | 10/1993 | Kaneko et al. | |
| 5,294,459 A | * 3/1994 | Hogan et al. | 427/96.2 |
| 6,158,672 A | 12/2000 | Millan | |
| 6,267,302 B1 | 7/2001 | Huffman | |
| 6,325,853 B1 | 12/2001 | Hogan et al. | |

(Continued)

FOREIGN PATENT DOCUMENTS

| | | |
|---|---|---|
| CA | 2 134 910 | 5/1995 |
| EP | 0 411 830 B1 | 11/1995 |
| WO | 2011/049081 A1 | 4/2011 |

OTHER PUBLICATIONS

International Searching Authority, Written Opinion and International Search Report for PCT/CA2012/001007, mailed Feb. 5, 2013.

Primary Examiner — Timothy Meeks
Assistant Examiner — Michael P Rodriguez
(74) Attorney, Agent, or Firm — Bereskin & Parr LLPS/S.E.N.C.R.L., s.r.l.

(57) ABSTRACT

An applicator for spraying an elastomeric material comprises an applicator body having an internal bore and a fluid inlet for receiving a supply of the elastomeric material. A nozzle is coupled to the applicator body and has a discharge end with a spray outlet in fluid communication with the fluid inlet via a fluid passageway. A needle valve is slidably mounted within the internal bore for movement between a closed position for closing the fluid passageway, and an open position for opening the fluid passageway so as to spray the elastomeric material. An air cap is coupled to the applicator body adjacent the nozzle for providing an atomizing airflow and a fan control airflow. The needle valve has a tip portion shaped to extend through the nozzle so as to be substantially flush with the discharge end of the nozzle when the needle valve is in the closed position.

20 Claims, 9 Drawing Sheets

(56) References Cited

U.S. PATENT DOCUMENTS

| | | |
|---|---|---|
| 6,685,106 B1 | 2/2004 | Van der Steur |
| 6,708,900 B1 | 3/2004 | Zhu et al. |
| 6,817,553 B2 | 11/2004 | Steur |
| 2006/0118661 A1 | 6/2006 | Hartle et al. |
| 2007/0199506 A1* | 8/2007 | Ahmed et al. ............ 118/66 |

* cited by examiner

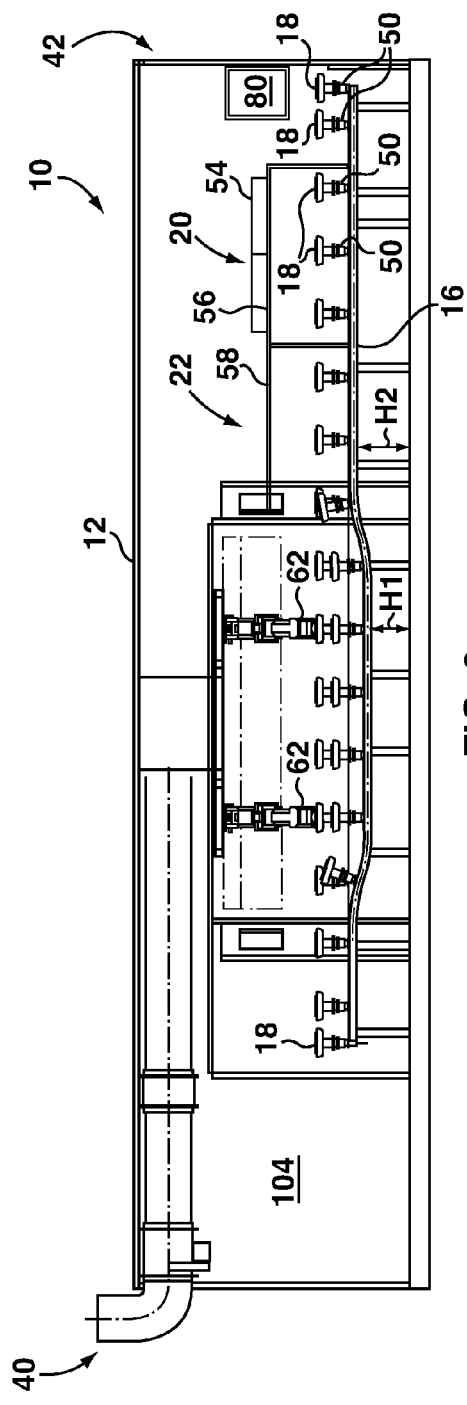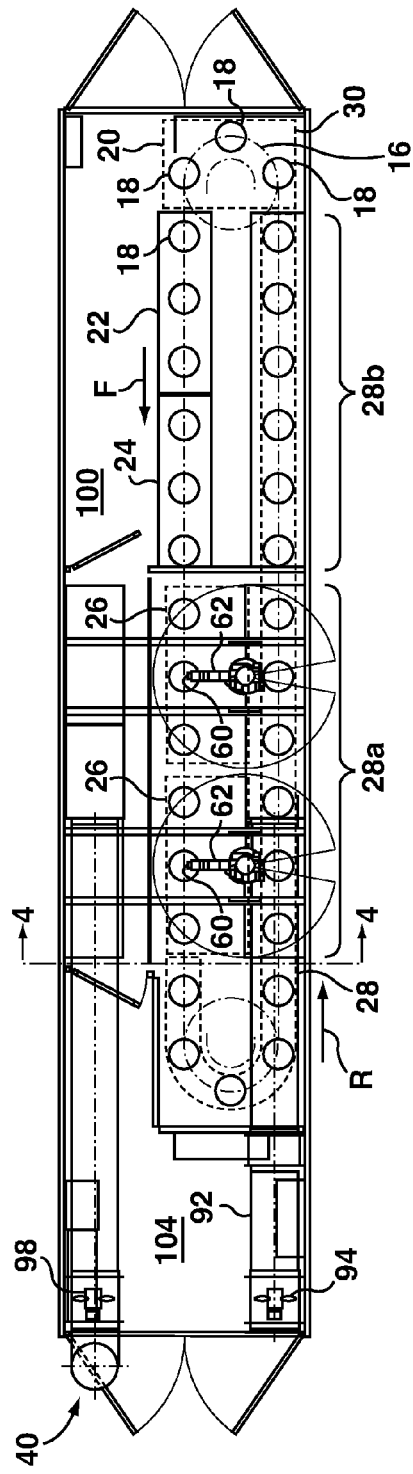

APPLICATOR FOR SPRAYING ELASTOMERIC MATERIALS

TECHNICAL FIELD

The present invention is directed to applying elastomeric coatings to industrial components, and in particular to mobile coating systems and spray applicators for applying silicone elastomeric coatings to high voltage line insulators.

BACKGROUND

Certain industrial components are often exposed to harsh environments. Some of these industrial components are coated in order to provide protection from these harsh environments and increase lifespan, reliability, or efficiency of the component.

As an example, electrical insulators used in high voltage power transmission lines are designed to maintain a minimum current discharge while operating outdoors. However, performance of the insulator degrades over time due to factors such as weather, moisture, corrosion, pollution, and so on. These factors can contaminate the surface of the insulator and can lead to the development of leakage currents that reduce the effectiveness of the insulator. These leakage currents can also cause arcing, which can further degrade the insulator surface. Eventually, a conductive path may form across the surface of the insulator and effectively short out the insulator, thereby nullifying its purpose.

One way of inhibiting degradation of electrical insulators is to coat the insulator with an elastomeric material such as a one component room temperature vulcanizable (RTV) silicone rubber. Such elastomeric coatings tend to enhance the outer surfaces of the insulator and can also improve insulator performance. For example, some coatings provide improved insulation, arc resistance, hydrophobicity, and resistance to other stresses imposed upon electrical insulators. Examples of such coatings are shown in the applicant's prior U.S. patents, specifically U.S. Pat. No. 6,833,407 issued Dec. 21, 2004; U.S. Pat. No. 6,437,039 issued Aug. 20, 2002; and U.S. Pat. No. 5,326,804 issued Jul. 5, 1994.

One problem is that the elastomeric coatings can be rather difficult to apply. For example, conventional high-pressure spraying techniques tend to have poor transfer efficiencies of 50% or lower, which results in vast amounts of wasted coating product.

Once an insulator is coated, it is then ready for installation. However, coating facilities are often located far away from the final installation site, possibly in other countries or on other continents. As such, transportation costs can represent a substantial expense when manufacturing and distributing coated insulators. Furthermore, the coatings applied to insulators can be damaged during transportation.

Another problem is that the coatings themselves may degrade over time while the insulator is in use, and at some point, it may be desirable to reapply the coating. However, as described above, the insulator might be deployed in remote areas far away from coating facilities, and transporting the insulator to a coating facility may be impractical.

One way of reapplying the coating is to manually re-coat the insulators in the field at a location closer to the insulator. Unfortunately, manual coating tends to provide an inconsistent quality coating and also tends to be inefficient. Furthermore, the environment and climate at different field locations tends to be variable. As such, it can be difficult to apply coatings with a consistent quality at various worksites located in different climates. Furthermore, in some cases, the climate of a particular field location may be unsuitable or unfavourable for re-coating the insulators. For example, the temperature or humidity of a particular field location may be outside optimal ranges for applying the particular coating.

In view of the above, there is a need for new and improved apparatus, systems, and methods of applying elastomeric coatings to industrial components such as electrical insulators.

SUMMARY OF THE INVENTION

The present application is directed to a mobile coating system for coating an electrical insulator. The system comprises an elongate shipping container that is transportable to a worksite. The shipping container has a first end and a second end longitudinally opposite to the first end. The system also comprises a plurality of stations located within the shipping container. The plurality of stations comprises a loading station for loading an insulator to be coated, at least one coating station that includes a robotically controlled applicator for applying an elastomeric coating to the insulator, a curing station located after the at least one coating station for curing the elastomeric coating, and an unloading station for unloading the coated insulator. The system also comprises an endless loop conveyor for conveying the insulator through the plurality of stations within the shipping, container. The endless loop conveyor has an elongated circular path.

The loading station and the unloading station may be located adjacent to each other. In some embodiments, the loading station and the unloading station may be conterminous. In some embodiments, the loading station and the unloading station may be located at the first end of the shipping container.

The system may further comprise an air supply for providing an airflow along a selected airflow path. The first curing region of the curing station may be located within the selected airflow path so as to enhance curing of the elastomeric coating. In some embodiments, the coating station may be located within the selected airflow path such that the airflow passes across the first curing region and then across the coating station so as to control overspray of the elastomeric coating.

In some embodiments, the conveyor may be configured to convey the insulator along a forward path toward the second end and then along a return path toward the first end. Furthermore, the coating station may be located along the forward path and the first curing region may be located along the return path adjacent to the coating station. Further still, the selected airflow path may be directed transversely across the first curing region and the coating station.

In some embodiments, the curing station may include a second curing region located downstream of the first curing region along the return path. The second curing region may be at least partially shielded from the coating station.

The at least one coating station may comprise a plurality of coating stations. Furthermore, each coating station may include a robotically controlled applicator for applying at least one layer of the elastomeric coating to the insulator. In some embodiments, the robotically controlled applicator of at least one of the coating stations may be configured to apply a plurality of layers of the elastomeric coating to the insulator.

The endless loop conveyor may be configured to move the insulator through each of the plurality of stations at an indexed time interval. In some embodiments, the endless loop conveyor may be configured to move a set of electrical insulators through each of the plurality of stations at the indexed time interval. Furthermore, in some embodiments, the indexed time interval may be less than about 10-minutes. In some embodiments, the robotically controlled applicator of each coating station may be configured to apply a plurality of layers of the elastomeric coating to each electrical insulator of the set of electrical insulators during the indexed time interval.

The endless loop conveyor may comprise a plurality of rotatable couplers. Furthermore, each rotatable coupler may be configured to support and rotate a respective electrical insulator about a rotational axis at a particular rotational speed.

In some embodiments, the system may further comprise a controller operatively coupled to the rotatable coupler for adjusting the rotational speed of each rotatable coupler.

In some embodiments, the robotically controlled applicator may include a spray applicator, and the controller may be configured to maintain a particular coating rate applied to a targeted area of the insulator being sprayed. Furthermore, the controller may maintain the particular coating rate by adjusting at least one of: rotational speed of the coupler, flow rate of the elastomeric coating from the spray applicator, and residence time for spraying the targeted area, based on tangential speed of the targeted area being sprayed.

In some embodiments, the robotically controlled applicator may include a spray applicator having an adjustable spray pattern, and the controller may be configured to control the adjustable spray pattern. In some embodiments, the controller may adjust the spray pattern based on at least one of: tangential speed of a targeted area being sprayed, and a particular geometry of the targeted area being sprayed.

The plurality of stations may comprise a preheating station for preheating the insulator. Furthermore, the preheating station may be located before the coating station. In some embodiments, the preheating station may be configured to preheat the insulator to at least about 25° C. In some embodiments, the preheating station comprises an infrared heater.

The plurality of stations may also comprise an equalization station located between the preheating station and the coating station. Furthermore, the equalization station may be configured to allow surface temperatures of the insulator to equalize.

The present application is also directed to a method of coating an electrical insulator. The method comprises providing a mobile coating system. The mobile coating system comprises a shipping container having a first end and a second end opposite to the first end, and a plurality of stations located within the shipping container. The plurality of stations comprises at least one coating station for applying an elastomeric coating to the insulator, and a curing station located after the at least one coating station for curing the elastomeric coating. The method further comprises loading the insulator into the mobile coating system, conveying the insulator through the plurality of stations along a circular path within the mobile coating system, applying at least one layer of elastomeric coating to the insulator at the coating station, curing the elastomeric coating on the coated insulated at the curing station, and unloading the coated insulator from the mobile coating system.

The method may further comprise transporting the mobile spray system to a remote worksite.

The present application is also directed to an applicator for spraying an elastomeric material. The applicator comprises an applicator body having a front end, a rear end, an internal bore, and a fluid inlet for receiving a supply of the elastomeric material. The applicator also comprises a nozzle coupled to the front end of the applicator body. The nozzle has a discharge end with a spray outlet in fluid communication with the fluid inlet via a fluid passageway. The spray outlet is shaped to spray the elastomeric material along a spray axis. The applicator also comprises a needle valve slidably mounted within the internal bore for movement along a longitudinal axis between a closed position for closing the fluid passageway, and an open position for opening the fluid passageway so as to spray the elastomeric material. The applicator also comprises an air cap coupled to the front end of the applicator body adjacent the nozzle. The air cap is configured to receive a supply of air from at least one airflow inlet and has a plurality of airflow outlets for providing an atomizing airflow so as to atomize the elastomeric material being sprayed, and a fan control airflow so as to provide a selected spray pattern for the elastomeric material being sprayed. The needle valve has a tip portion shaped to extend through the nozzle so as to be substantially flush with the discharge end of the nozzle when the needle valve is in the closed position.

The tip portion of the needle valve may have a frustoconical end configured to be substantially flush with the discharge end of the nozzle when the needle valve is in the closed position.

The applicator may further comprise at least one supporting member for maintaining alignment of the needle valve within the internal bore. In some embodiments, the at least one supporting member may comprise a plurality of supporting members for maintaining alignment of the needle valve within the internal bore.

In some embodiments, the needle valve may have a middle portion of increased diameter compared to the tip portion, and the internal bore may have a middle section with a diameter sized to slidably and supportably receive the middle portion of the needle valve. In some embodiments, the at least one supporting member may include a throat seal member positioned rearwardly of the middle section of the internal bore. Furthermore, the throat seal member may be configured to slidably receive and support the needle valve therethrough.

In some embodiments, the at least one supporting member may include an insert positioned forwardly of the middle section of the internal bore. The insert may be configured to slidably receive and support the needle valve therethrough.

In some embodiments, the fluid passageway may have an annular section extending through the internal bore around the needle valve forwardly of the rod seal. Furthermore, the needle valve may have a front portion aligned with the annular section. The front portion of the needle valve may be of intermediate diameter compared to the tip portion and the middle portion of the needle valve. In some embodiments, the nozzle may have a nozzle bore for receiving the tip portion of the needle valve. The nozzle bore may form a portion of the annular section of the fluid passageway and may be of reduced diameter compared to the middle section of the internal bore.

The plurality of airflow outlets on the air cap may include an atomizing airflow outlet located adjacent the spray outlet of the nozzle for providing the atomizing airflow. In some embodiments, the air cap may have a base portion with a front face substantially flush with the discharge end of the nozzle, and the atomizing airflow outlet may be located on the base portion.

In some embodiments, the atomizing airflow outlet may be defined by an annular gap between the nozzle and the base portion. In some embodiments, the annular gap may have an annular thickness of between about 1-millimeter and about 3-millimeters.

The plurality of airflow outlets on the air cap may include a first set of fan control airflow outlets for directing a first portion of the fan control airflow along a first direction so as to meet at a first focus along the spray axis, and a second set of fan control airflow outlets for directing a second portion of the fan control airflow along a second direction so as to meet at a second focus along the spray axis. In some embodiments, both the first focus and the second focus may be located forwardly of the air cap. In some embodiments, the first focus and the second focus may be conterminous.

In some embodiments, the air cap may include a base portion coupled to the front end of the applicator body and a set of horns projecting forwardly from the base portion. Furthermore, the first and second sets of fan control airflow outlets may be located on the set of horns. In some embodiments, the second set of fan control airflow outlets may be located on the set of horns forwardly relative to the first set of fan control airflow outlets.

The at least one airflow inlet may include an atomizing airflow inlet for providing the atomizing airflow and a fan control airflow inlet for providing the fan control airflow.

The applicator may further comprise a mounting plate for removably fastening the applicator body to a robot. The mounting plate may have an interior mounting surface configured to abut the applicator body, and a plurality of ports for receiving a plurality of supply lines. The supply lines may include a fluid supply line for supplying the elastomeric material to be sprayed and at least one air supply line for supplying the air for the atomizing airflow and the fan control airflow. Each port may include a embossment adjacent the interior mounting surface for receiving a barb of a corresponding supply conduit.

In some embodiments, at least one of the applicator body, the nozzle, the fluid passageway, the needle valve, and the air cap may be configured to spray the elastomeric material at a low pressure. For example, the low pressure may be less than about 250 psi, or more particularly, the low pressure may be less than about 60 psi.

The present application is also directed to a method of applying a silicone elastomeric coating. The method comprising spraying an elastomeric material using an applicator comprising: an applicator body having a front end, a rear end, an internal bore, and a fluid inlet for receiving a supply of the elastomeric material; a nozzle coupled to the front end of the applicator body, the nozzle having a discharge end with a spray outlet in fluid communication with the fluid inlet via a fluid passageway, the spray outlet being shaped to spray the elastomeric material along a spray axis; a needle valve slidably mounted within the internal bore for movement along a longitudinal axis between a closed position for closing the fluid passageway and an open position for opening the fluid passageway so as to spray the elastomeric material; and an air cap coupled to the front end of the applicator body adjacent the nozzle. The air cap having at least one airflow inlet for receiving a supply of air and a plurality of airflow outlets for providing: an atomizing airflow so as to atomize the elastomeric material being sprayed; and a fan control airflow so as to provide a selected spray pattern for the elastomeric material being sprayed.

The method may further comprise supplying the elastomeric material at a low pressure of less than about 250 psi.

The present application is also directed to a method of applying a silicone elastomeric coating. The method comprises supplying an elastomeric material to a spray applicator at a low pressure of less than about 250 psi, and spraying the elastomeric material at the low pressure using the applicator.

Other aspects and features of the invention will become apparent, to those ordinarily skilled in the art, upon review of the following description of some exemplary embodiments.

BRIEF DESCRIPTION OF THE DRAWINGS

The invention will now be described, by way of example only, with reference to the following drawings, in which:

FIG. 2 is a side elevation view of the mobile coating system of FIG. 1;

FIG. 3 is a top plan view of the mobile coating system of FIG. 1;

DETAILED DESCRIPTION OF THE INVENTION

Figure 1:
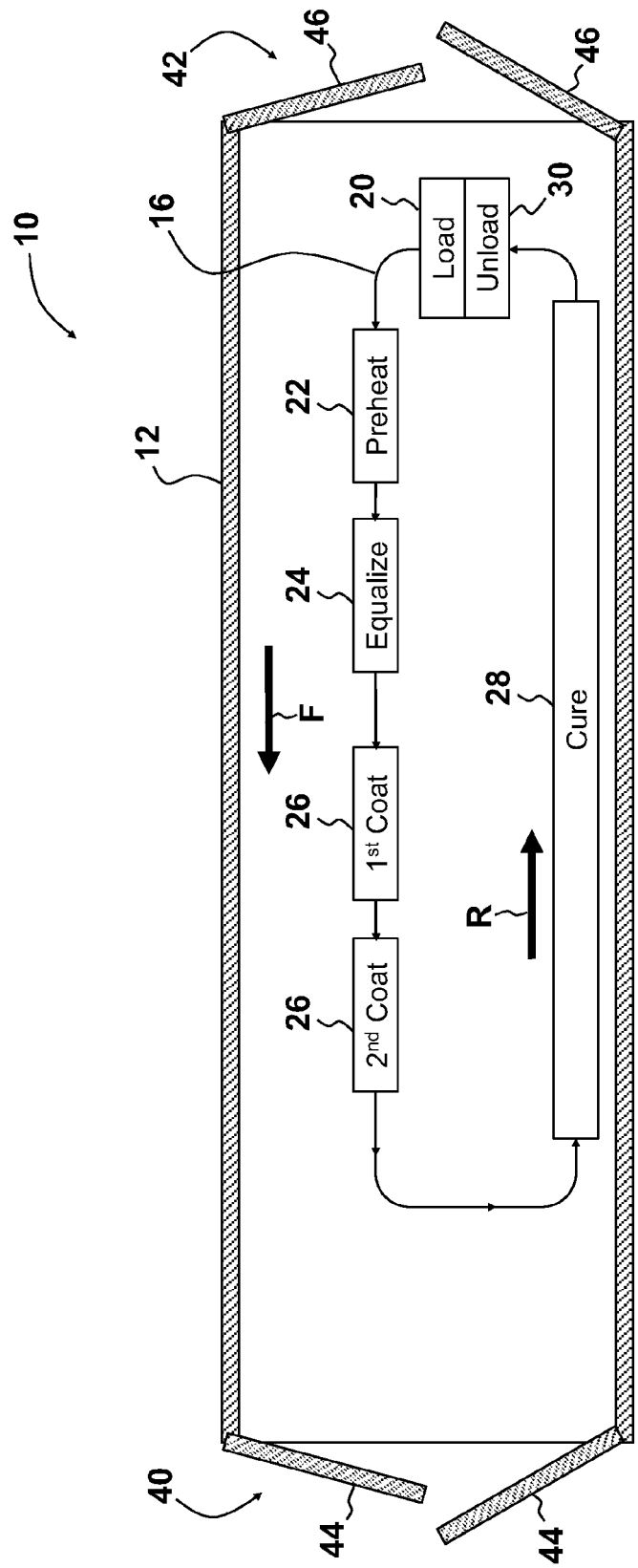
FIG. 1 is a schematic top plan view of a mobile coating system made in accordance with an embodiment of the invention.

Referring to FIG. 1, illustrated therein is a mobile coating system 10 for coating an industrial component with an elastomeric coating. More particularly, the mobile coating system 10 can be used to coat an electrical insulator with a one component room temperature vulcanizable (RTV) silicone rubber.

The mobile coating system 10 comprises an elongate shipping container 12, a plurality of stations 20, 22, 24, 26, 28, 30, located within the shipping container 12, and an endless loop conveyor 16 for conveying one or more insulators through the stations within the shipping container 12. More particularly, as shown in FIG. 1, the conveyor 16 is configured to convey the insulators from a loading station 20, then through a preheating station 22, an equalization station 24, two coating stations 26, a curing station 28, and finally to an unloading station 30.

The shipping container 12 is configured to be transportable to a worksite. For example, the shipping container 12 may be an intermodal shipping container that can be transported using a number of forms of transportation such as truck, train, ship, and so on. In some embodiments, the shipping container 12 may be a standard 40-foot long high-cube shipping container having a width of about 8-feet, and a height of about 9.5-feet. In some embodiments, the shipping container 12 may have other sizes, such as 45-foot long containers, or containers with heights of about 8-feet, and so on.

After transporting the shipping container 12, the mobile coating system 10 can be set up at a worksite located near the insulators to be coated, and then used to coat one or more electrical insulators. This is particularly beneficial when the insulators to be coated are located in remote areas that might otherwise be far away from conventional automated coating facilities. As an example, the mobile coating system 10 can be used to refurbish existing insulators that are already in operation (e.g. on an overhead high-voltage power transmission line), in which case, the insulators may be uninstalled, coated and then re-installed. As another example, the mobile coating system 10 can be used to coat new insulators at a factory, for example, when the factory might otherwise be located far away from an existing coating facility. In both scenarios, the mobile coating system 10 reduces product transportation, which can reduce costs and damage associated with transporting the insulator.

As shown in FIG. 1, the shipping container 12 extends between a front end 40 and a rear end 42 longitudinally opposite to the front end 40. Each end 40 and 42 of the shipping container 12 has a set of doors 44 and 46, which allows users to access the interior of the shipping container 12, for example, to load and unload insulators onto the conveyor 16.

The endless loop conveyor 16 has an elongated circular path. For example, in FIG. 1, the conveyor 16 is configured to convey the insulators from the loading station 20 along a forward path toward the front end 40 (indicated by arrow F) and then back to the unloading station 30 along a return path toward the rear end 42 (indicated by arrow R). As shown, insulators move along the forward path F through the preheating station 22, equalization station 24 and the coating stations 26. Then, the insulators move along the return path R through the curing station 28.

The elongated circular path of the conveyor 16 is also configured so that the loading and unloading stations 20 and 30 are located adjacent to each other, and more particularly, conterminous with each other. This allows the insulators to be loaded and unloaded at the same general location. As shown in FIG. 1, the loading and unloading stations 20, 30 are located at the rear end 42 of the shipping container 12, which provides access to the loading and unloading stations 20 and 30 from rear doors 46. In other embodiments, the loading and unloading stations 20, 30 may be separate and distinct, and may be located in other positions, such as at the front end 40, or along the elongate sides of the shipping container 12.

Providing the conveyor 16 with an elongated circular path enables all of the stations 20, 22, 24, 26, 28, and 30 to fit within a standard 40-foot long high-cube shipping container. If a straight path were used, a longer shipping container or multiple shipping containers might be necessary, which might adversely affect mobility of the mobile coating system 10. For example, a longer shipping container might make it difficult or impossible to travel to some remote locations where insulators are located. Further, providing a circular path with a conterminous load and unload station enables a single operator to load and unload parts. In contrast, if a straight path were used, additional operators might be needed at each end of the shipping container to load and unload the insulators.

Referring now to FIGS. 2-5, the stations of the mobile coating system 10 will be described in more detail.

Figure 5:
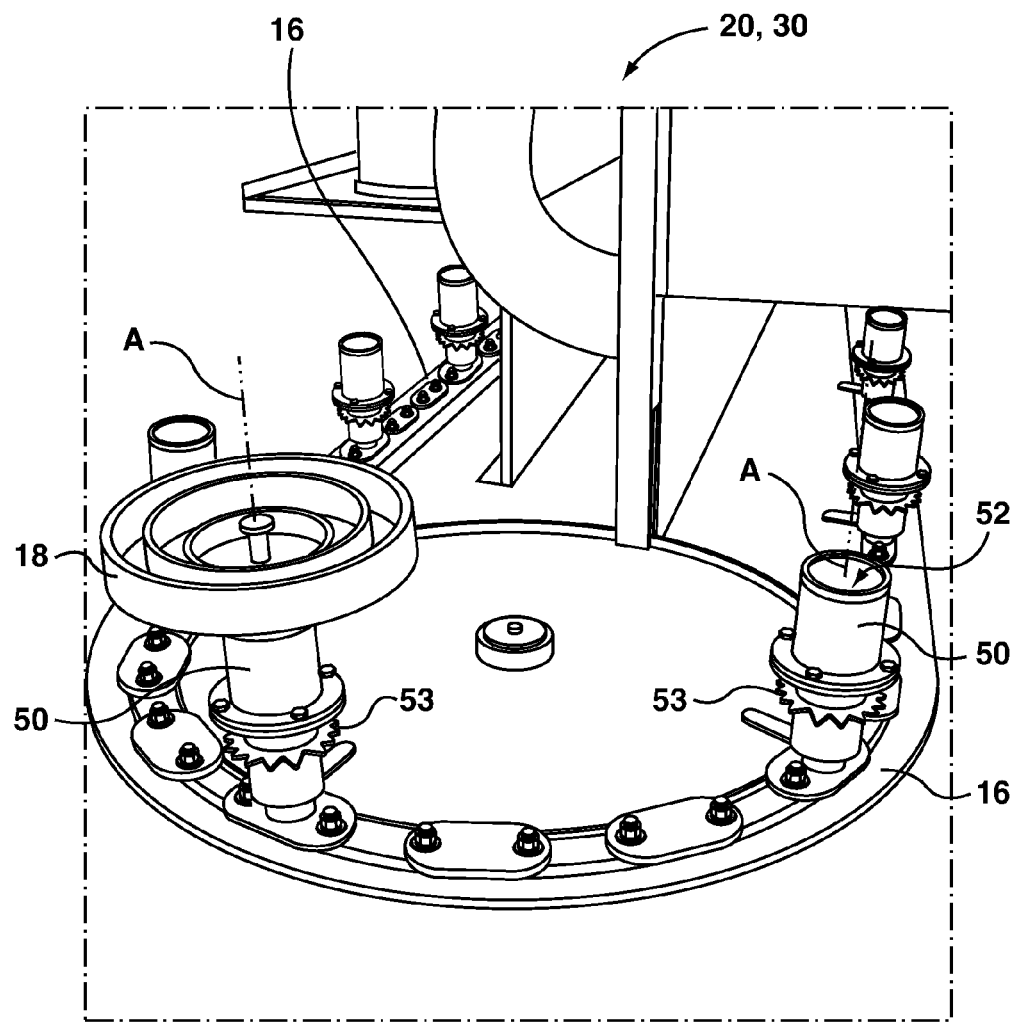
FIG. 5 is a perspective view of a conveyor and a set of rotatable couplers for use with the mobile coating system of FIG. 1.
Figure 5A:
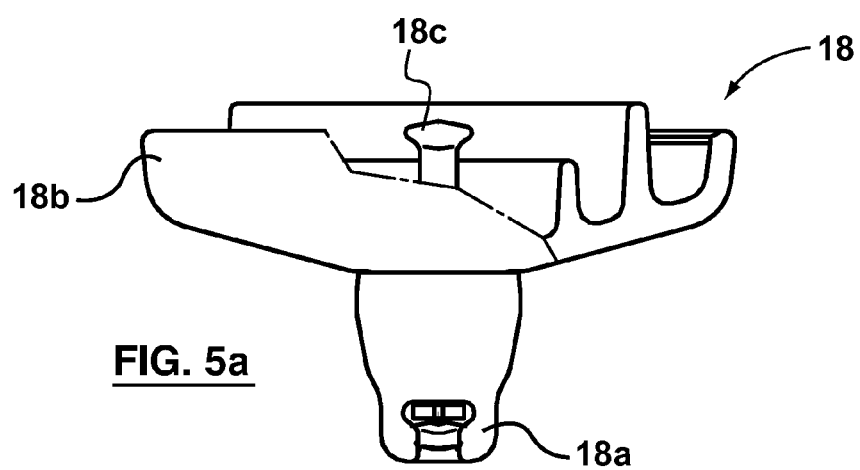
FIG. 5a is a partial cross-sectional elevation view of an insulator that can be held by the rotatable couplers shown in FIG. 5.

In use, one or more insulators 18 are loaded onto the conveyor 16 at the loading station 20. For example, referring to FIGS. 2 and 5, the conveyor 16 includes a plurality of couplers 50 for holding and supporting the insulators 18 while conveying the insulators 18 through the stations. As shown in FIGS. 5 and 5A, each coupler 50 has a socket 52 for slidably receiving a cap 18a (also referred to as a stem) of an insulator 18. The socket 52 may be lined with padding to help hold the insulator 18 in place. For example, the padding may include felt pads, foam, and so on.

As shown in FIG. 5a, the insulator 18 includes a cap 18a, a shell 18b attached to the cap 18a, and a pin 18c attached to the shell 18b opposite the cap 18a. The shell 18b is generally made from glass, glazed porcelain, or another dielectric material so as to electrically insulate the cap 18a from the pin 18c. The cap 18a is generally shaped to receive the pin 18c of another insulator so that the insulators may be hung together.

While the shell 18c of the insulator 18 shown in FIG. 5a has ridges and valleys, in other embodiments, the shell 18c may have other shapes, such as a flat or concave disc without ridges and valleys.

In some embodiments, an adapter (not shown) may be placed on the cap 18a of the insulator 18 before being inserted into the socket 52, for example, to accommodate insulators having different cap sizes. More particularly, the adapter may have a standardized outer diameter sized and shaped to fit within the socket 52 of the coupler 50. Furthermore, each adapter may have an inner socket sized and shaped to receive the cap 18a of a particular insulator to be coated. Accordingly, the size and shape of the inner socket may be different for different insulators. In some embodiments, the adapter may be vacuum formed, or may be formed using other manufacturing techniques such as injection moulding.

In some embodiments, the couplers 50 may hold and support the insulators 18 using clamps, brackets, and so on. Furthermore, while the insulator 18 shown in FIG. 5 is being held with the cap down, in other embodiments, the insulator 18 may be held in other orientations, such as with the cap up, sideways, and so on.

In some embodiments, each coupler 50 may be configured to support and rotate a respective electrical insulator 18 about a rotational axis A and at a particular rotational velocity. For example, in the illustrated embodiment, each coupler 50 has a sprocket 53 that can be driven by a motor (not shown) so as to rotate the coupler 50 about a vertically extending rotation axis A. Rotating the insulator 18 can be useful while applying the elastomeric coating, as will be described later below.

Once loaded, the endless loop conveyor 16 moves the insulator 18 through each of the stations. Once at a particular station, the insulator 18 stays at that station for some particular time interval before advancing to the next station. The duration of time between each station is referred to as an "indexed time interval".

The duration of the indexed time interval may depend on how long it takes to apply a coating. For example, the coating process may be longer for larger insulators, or insulators with complex geometries. In some embodiments, the indexed time interval may be set automatically based on the particular geometry of the insulator. For example, in some embodiments, the indexed time interval may be less than about 10-minutes, and more particularly, the indexed time interval may be less than about 5-minutes.

In some embodiments, the conveyor 16 may move the insulators 18 through each of the plurality of stations in sets or groups. For example, as indicated in FIG. 3, the conveyor 16 is configured to move a set of three insulators 18 through each station as a group. Accordingly, each set of insulators 18 advances to subsequent stations at the indexed time interval.

The conveyor 16 operates at a speed according to the particular indexed time interval and the number of insulators in each grouping. For example, in some embodiments, the conveyor 16 may operate at a speed of about 20 feet per minute. In such embodiments, it may take about 20 seconds to advance the insulators from one station to the next station.

As shown in FIG. 3, after being loaded onto the conveyor 16 the insulators 18 move to a preheating station 22. The preheating station 22 may be configured to preheat the insulators 18 to a particular temperature, for example, of about 25° C. or higher. Preheating the insulators 18 may aid in the application, adherence, and curing of the elastomeric coating to the surface of the insulator. For example, preheating may help evaporate moisture on the surfaces of the insulator, which might otherwise interfere with the coating process.

The preheating station 22 may heat the insulators using one or more heat sources. For example, as shown, the preheating station 22 may include a heater such as an infrared heater 54. Furthermore, the preheating station 22 may receive heated air from a separate source, such as a ventilation system. In such embodiments, a hot air blower may supply air at a temperature of between about 25° C. and about 150° C.

In some embodiments, the preheating station 22 may be contained within an enclosure 56 so as to define a preheating chamber. The enclosure 56 may have a box-like shape and may be made from a refractory material such as sheet metal, ceramic, and so on. As shown in FIG. 1, the infrared heater 54 may be affixed to an upper portion of the enclosure 56 so as to radiate heat downward toward the insulators 18.

After the preheating station 22, the preheated insulators 18 move to an equalization station 24 for allowing surface temperatures of the insulators 18 to equalize. Allowing surface temperatures to equalize may be useful, particularly in instances where the preheating station 22 heats the insulator 18 unevenly. For example, the overhead infrared heater 54 may heat upper surfaces of the insulator 18 more than lower surfaces. Letting the insulators 18 rest in the equalization station 24 may allow the lower surfaces to heat up while the upper surfaces cool down.

As shown, the equalization station 24 may be enclosed within an enclosure 58 so as to define an equalization chamber. The enclosure 58 may be similar to the enclosure 56 of the preheating station 22.

In some embodiments, the system 10 may provide an airflow over the insulators 18 while at the equalization station 24, which may speed up the equalization process. The airflow through the equalization station 24 may be at ambient temperature, or may be heated, for example, to a temperature of between about 30° C. and about 50° C.

After the equalization station 24, the insulators 18 move to the coating stations 26. In the illustrated embodiment, there are two coating stations 26 positioned sequentially one after the other. Each coating station 26 includes a robotically controlled applicator for applying an elastomeric coating to the insulator 18.

The elastomeric coating may be a silicone elastomeric coating as taught in U.S. Pat. No. 6,833,407 issued Dec. 21, 2004; U.S. Pat. No. 6,437,039 issued Aug. 20, 2002; U.S. Pat. No. 5,326,804 issued Jul. 5, 1994; and particularly the one part RTV silicone compositions taught in U.S. Pat. No. 5,326,804 issued Jul. 5, 1994.

Figure 4:
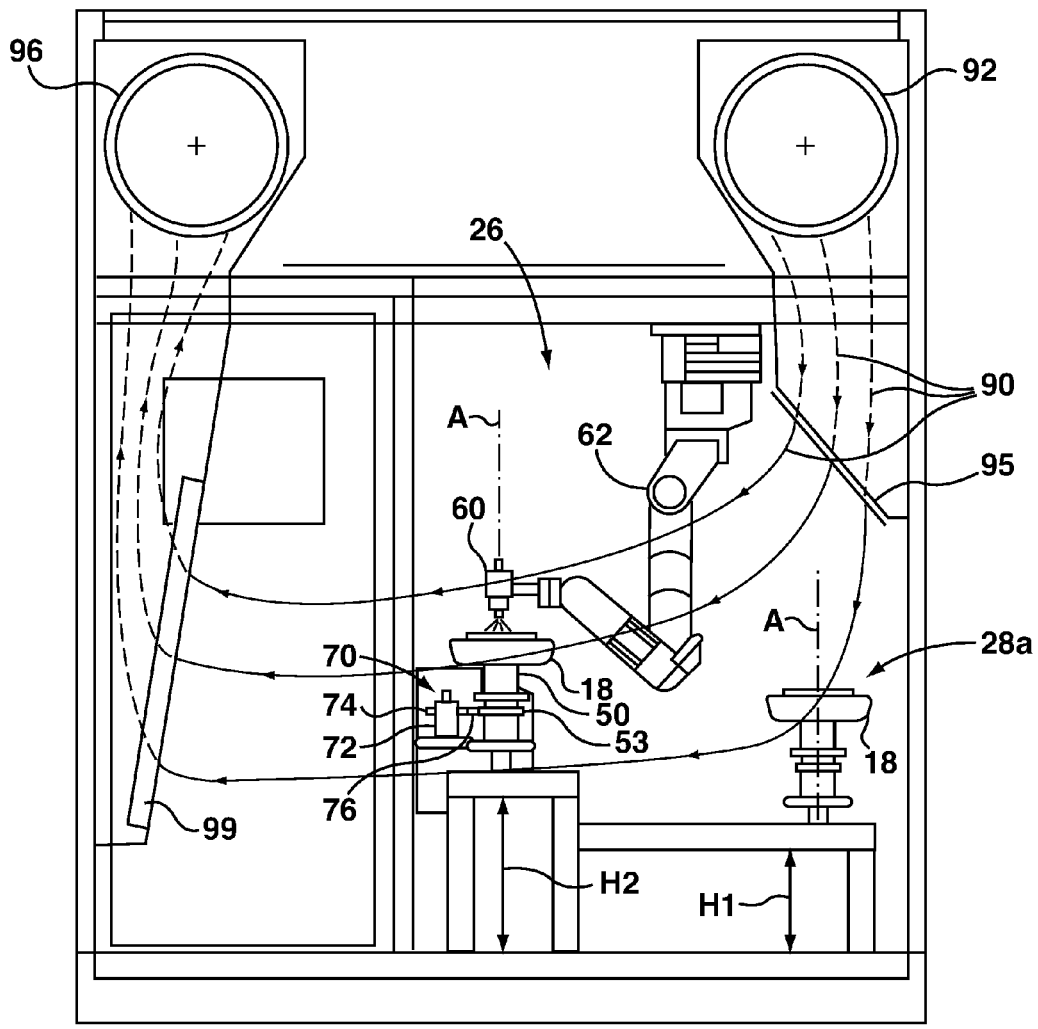
FIG. 4 is a cross-sectional view of the mobile coating system of FIG. 3 along the line 4-4, which shows a coating station.

The coating may be applied using a number of coating techniques, such as robotic spray coating. More particularly, as shown in FIG. 4, each coating station 26 includes a spray applicator 60 and a robot 62 for controlling the spray applicator 60. The robot 62 may be a multi-axis robot such as a six-axis robot. The applicator 60 may be a standard spray applicator or a specialized spray applicator specifically adapted to spray elastomeric materials, such as the applicator 200 described further down below.

The robotically controlled applicator of each coating station 26 is configured to apply at least one layer of coating to the insulators 18. In some embodiments, one or more of the robotically controlled applicators may be configured to apply a plurality of layers of the coating to each insulator 18. The number of layers may be selected to provide a coating having a particular nominal thickness, which may be at least about 150 microns thick, or more particularly, at least about 300 microns thick.

In some embodiments, each layer of the coating may be applied to a particular area of the insulator. For example, the robotically controlled applicator may be configured to apply multiple layers of the coating specifically to areas that are difficult to reach. As an example, the robotically controlled applicator of the first coating station 26 may apply a first layer of the coating to the entirety of each insulator in a particular group, and then apply two additional layers of the coating to the generally difficult to reach ridges and valleys of each insulator 18, or vice versa. Subsequently, the robotically controlled applicator of the second coating station 26 may apply two layers of the coating to the entirety of each insulator 18 in a particular group. In some embodiments, the layers may be applied by the robots 62 in other sequences.

While the illustrated embodiment includes two coatings stations 26, in some embodiments the mobile coating system 10 may include one or more coating stations.

As described above, the insulators 18 may be rotated while being coated. As such, the mobile coating system 10 may include a drive mechanism 70 for rotating the rotatable couplers 50 while the insulators are at the coating stations 26. As shown in FIG. 4, the drive mechanism 70 includes a motor 72 that turns a drive sprocket 74 for operating a drive chain 76. The drive chain 76 in turn rotates the sprockets 53 of each corresponding rotatable coupler 50 at the coating stations 26 so as to rotate the respective insulator 18 about the corresponding vertical rotational axis A. In other embodiments, the drive mechanism 70 may have other configurations, such as a pulley system, an individual motor on each coupler 50, and so on. In such embodiments, the sprocket 53 on the coupler may be omitted or replaced by another device such as a pulley.

While the illustrated embodiment includes one drive mechanism 70 for rotating all of the couplers located at both coating stations 26, in other embodiments the system may include a plurality of drive mechanisms. For example, there may be a first drive mechanism for rotating the couplers at the first coating station 26, and a second drive mechanism for rotating the couplers at the second coating station 26. As another example, there may be an individual drive mechanism for rotating each individual coupler.

In the illustrated embodiment, the drive mechanism 70 is configured to rotate the rotatable couplers 50 while the robotic spray applicator of each coating station 26 applies the coating. This allows the robotic spray applicator to apply the coating to the entire insulator 18 without reaching behind the insulator 18. This can help reduce complex robotic movements while providing a coating with a uniform thickness.

As shown in FIGS. 2 and 3, the mobile coating system 10 may include a controller 80 adapted to control the rotational speed of the couplers 50 while the insulator 18 is being coated. For example, the controller 80 may be operatively connected to the rotatable couplers 50 via the drive mechanism 70. More particularly, the controller 80 may adjust the speed of the motor 72 so as to rotate the coupler 50 at a speed of between about 10 RPM and about 120 RPM. In some embodiments, the controller 80 may be configured to rotate the coupler 50 at a speed of between about 30 RPM and about 60 RPM.

In some embodiments, the controller 80 may be configured to maintain a particular coating rate applied to a targeted area of the insulator being sprayed. For example, the controller 80 may be configured to adjust the rotational speed of each coupler 50 so as to provide a particular tangential speed of the targeted area being sprayed. Adjusting the rotational speed of the coupler 50 might help to provide a coating of uniform thickness by maintaining a constant relative speed between the spray applicator 60 and the targeted area being sprayed.

For example, if the coupler 50 were rotated at a constant speed, the outer radial surfaces of the insulator 18 would move at a higher velocity in comparison to surfaces that are closer to the rotational axis A. If the applicator sprayed the elastomeric material at the same rate, less coating would be applied to the faster moving outer radial surfaces in comparison to the slower moving inner surfaces, which might result in a coating of uneven thickness. To account for this velocity difference, the controller 80 may increase the rotational speed of the coupler 50 when the spray applicator 60 is spraying a targeted area closer to the rotational axis A. Increasing the rotational speed increases the tangential speed of the targeted area (e.g. the radially inner surfaces of the insulator), and thereby apply less coating to the targeted area. Similarly, the controller 80 may decrease the rotational speed of the coupler 50 when the spray applicator 60 is spraying a targeted area radially outward from the rotational axis A so as to decrease the tangential speed of the targeted area (e.g. the outer radial surfaces) and thereby apply more coating to the targeted area.

In some embodiments, the controller 80 might be operatively connected to the robotically controlled spray applicator (e.g. the spray applicator 60 and the robot 62). In such embodiments, the controller 80 may be configured to adjust parameters of the robotically controlled spray applicator, such as movements of the robot 62, the flow rate of elastomeric material from the spray applicator 60, or spray patterns associated with the spray applicator 60. The controller 80 may adjust one or more of these parameters based on tangential speed of the targeted area being sprayed, for example, to help maintain a particular coating rate applied to the targeted area being sprayed. For example, controlling robot movements may adjust residence time for the targeted area being sprayed. More particularly, spraying the targeted area for a longer residence time might increase the amount of coating applied. As another example, increasing the flow rate might increase the amount of coating applied.

In yet another example, the controller 80 may be configured to adjust spray patterns depending on the area of the insulator being sprayed. In particular, it might be desirable to use a wide spray pattern with a high flow rate on large areas such as the outer radial surfaces of the insulator 18. Conversely, it might be desirable to use a narrow spray pattern with a low flow rate on smaller areas that are difficult to reach such as ridges and valleys of the insulator 18.

Adjusting the spray pattern of the spray applicator 60 can also help account for the different surface velocities of the insulator (e.g. the faster moving outer radial surfaces and the slower moving inner radial surfaces). For example, it may be desirable to use a spray pattern with a higher flow rate when spraying faster moving outer surfaces, and it may be desirable to use a spray pattern with a lower flow rate when spraying slower moving inner surfaces.

In some embodiments, the controller 80 may be configured to store a large number of spray patterns, for example, at least one hundred different spray patterns, and possibly even more. The controller 80 may also be configured to store multiple robot positions for positioning and orienting the spray applicator 60. These spray patterns and positions may be stored on a memory storage device, such as a hard drive, programmable memory, flash memory, and so on.

The different spray patterns and robot positions may be selected based on the particular insulator being coated. For example, an operator may select a preconfigured program with various spray patterns and robot positions for a particular model number of an insulator being coated. Furthermore, the operator may be able to select a custom program for individual insulators that do not yet have preconfigured programs. The custom programs may be selected based on size, shape, and complexity of the insulator being coated.

While the coating stations 26 of the illustrated embodiment include robotically controlled spray applicators, in other embodiments, the coating stations 26 may utilize other coating techniques such as spin coating or dip coating. For example, the coating stations 26 may utilize dip coating wherein the insulators are dipped in a bath of elastomeric material that covers and adheres to the surfaces of the insulators. Furthermore, the insulators may be rotated at a specific speed during or after being dipped to provide a uniform coating of a particular thickness. When utilizing dip coating, the coating station 26 may be maintained under a nitrogen enriched atmosphere so as to avoid skinning of the surface of the elastomeric composition during application or distribution of the coating on the surface of the insulator.

After the coating stations 26, the coated insulators 18 move to the curing station 28 for curing the elastomeric coating. The curing station 28 may be maintained at a particular temperature and humidity that enhances the curing process. For example, the temperature may be maintained between about 25° C. and about 60° C., or more particularly between about 30° C. and about 45° C., and the humidity may be maintained between about 15% and about 80% relative humidity, or more particularly between about 50% and about 75% relative humidity.

In the illustrated embodiment, the curing station 28 includes a first curing region 28a located on the return path R across from the coating stations 26, and a second curing region 28b located on the return path R across from the preheating station 22 and the equalization station 24.

Referring to FIGS. 3 and 4, the mobile coating system 10 includes an air supply for providing an airflow along a selected airflow path (the airflow path is indicated in FIG. 4 by the dashed and solid lines 90). As shown in FIG. 3, the airflow may be supplied by a ventilation system, which may include an inlet duct 92 and an air supply fan 94 located within the inlet duct 92. As indicated in FIG. 4, the air supply fan 94 may push air through the inlet duct 92 and outward therefrom along the selected airflow path 90.

Referring still to FIG. 4, the first curing region 28a is located within the selected airflow path 90 so as to enhance curing of the elastomeric coating. In some embodiments, the airflow may be provided at a particular temperature or a particular humidity, for example, to enhance the curing process as described above. The inlet ducting 92 may also include inlet air filters 95 for removing particles such as dirt that might otherwise enter the air supply and contaminate the coatings while being cured.

The mobile coating system 10 also includes an exhaust for exhausting the airflow. The exhaust may draw the airflow outside the shipping container 12 via an exhaust duct 96. As shown in FIG. 3, in some embodiments, the exhaust may include an exhaust fan 98 or another suction device for drawing the airflow along the selected airflow path 92 and out the exhaust duct 96. In some embodiments, the exhaust may also include exhaust air filters 99 for removing particles, volatile chemicals, flammable vapours, droplets of overspray, and so on, prior to exhausting the airflow to the outside environment.

In some embodiments, the exhaust may include a scrubber for removing fumes prior to exhausting the airflow. For example, the exhaust may include a VOC scrubber so as to meet VOC regulations.

In the illustrated embodiment, the coating stations 26 are located within the selected airflow path 90 downstream of the first curing region 28a. More particularly, in the illustrated embodiment, the coating stations 26 are located along the forward path F of the conveyor 16, and the first curing region 28a is located along the return path R adjacent to the coating stations 26 such that the selected airflow path 90 is directed transversely across the first curing region 28a and then across the coating stations 26. This configuration can help contain overspray from the robotically controlled spray applicators. For example, if the robotically controlled spray applicators generate overspray, the airflow can reduce the likelihood of overspray reaching insulators within the first curing region 28a because the airflow tends to push the overspray toward the exhaust. Without the airflow, the overspray might interfere with the curing process, for example, by adhering to insulators that are curing in the first curing region 28a, which could result in a non-uniform coating or a coating of uneven thickness.

The exhaust fan 98 can also help control overspray by providing negative air pressure, which may help draw any overspray out the exhaust duct 96. Furthermore, exhaust air filters 99 may help capture overspray and other chemicals prior to exhausting the air to the outside environment.

In the illustrated embodiment, the second curing region 28b is located downstream of the first curing region 28a along the return path R. Furthermore, the second curing region 28b is at least partially shielded from the coating stations 26, for example, by containing the second curing region 28b in an enclosure. The enclosure may be similar to the enclosures 56 and 58 described previously with respect to the preheating station 22 and the equalization station 24. Shielding the second coating region 28b from the coating stations 26 may reduce the likelihood of overspray adhering to insulators that are curing in the second curing region 28b.

In some embodiments, the ventilation system may provide a supply of heated air to the second curing region 28b. This supply of air may enhance the curing process. Furthermore, supplying air to the second curing region 28b may provide positive air pressure that reduces the likelihood of overspray travelling toward the rear end 42 of the shipping container 12.

Referring to FIG. 3, the mobile coating system 10 includes an access corridor 100 extending longitudinally along the shipping container 12. The access corridor 100 provides access to the conveyor 16 and each of the stations, for example, in order to allow operators to monitor the insulators through each station, or to perform maintenance. The access corridor 100 may include doors on either side of the coating station so as to contain overspray.

The front end 40 of the shipping container 12 also includes a mechanical section 104. The mechanical section 104 may include electrical equipment, ventilation systems, heaters, humidifiers, and so on.

As indicated above, the size of the shipping container 12 limits the amount of the space for the various aspects of the mobile coating system 10 such as the conveyor 16 and the various stations. In order to enclose everything within the shipping container 12, the stations are provided along a conveyor with an elongated circular path. Due to this configuration, some stations on the forward path F are located adjacent to other stations along the return path R. For example, the coating stations 26 are located transversely adjacent to the first curing region 28a of the curing station 28. This can be problematic because the robots 62 of the coating stations 26 need a certain amount of room to manoeuvre both vertically and horizontally. As shown in FIGS. 2 and 4, the manoeuvrability problem can be overcome by reducing the height of the conveyor 16 through the first curing region 28a. In particular, the conveyor 16 has a reduced height "H1" through the first curing region 28a, which is at a lower elevation in comparison to other portions of the conveyor, which have a height "H2".

In other embodiments, the manoeuvrability of the robots may be accommodated by providing a taller shipping container or by using low-profile robots. However, taller shipping containers may be less mobile, and low-profile robots may be more expensive.

Use of the mobile system 10 can provide the ability to coat insulators located remotely from conventional coating facilities. This includes re-coating existing insulators as part of a refurbishing program, and coating new insulators.

Furthermore, the mobile system 10 can apply coatings in a consistent, uniform, and reliable fashion. For example, the mobile system 10 provides one or more controlled environments enclosed within the shipping container 12 that can help provide suitable conditions for coating insulators. More particularly, temperature and humidity within one or more areas of the shipping container 12 can be controlled so as to enhance preconditioning, coating, or curing of the insulator. This can be particularly beneficial because the insulators to be coated might be located in a variety of locations with different climates, some of which might otherwise be unsuitable or unfavourable for coating new or refurbished insulators.

Another benefit is that the use of robotically controlled applicators can help provide a consistent and repeatable process, which might help provide coatings of uniform thickness.

While the illustrated embodiment includes a number of specific stations, in some embodiments one or more of the stations may be omitted, and other stations may be added. For example, in some embodiments, the preheating station and the equalization station may be omitted. Furthermore, in some embodiments, a cleaning station may be added for cleaning the insulators prior to being coated.

Figure 6:
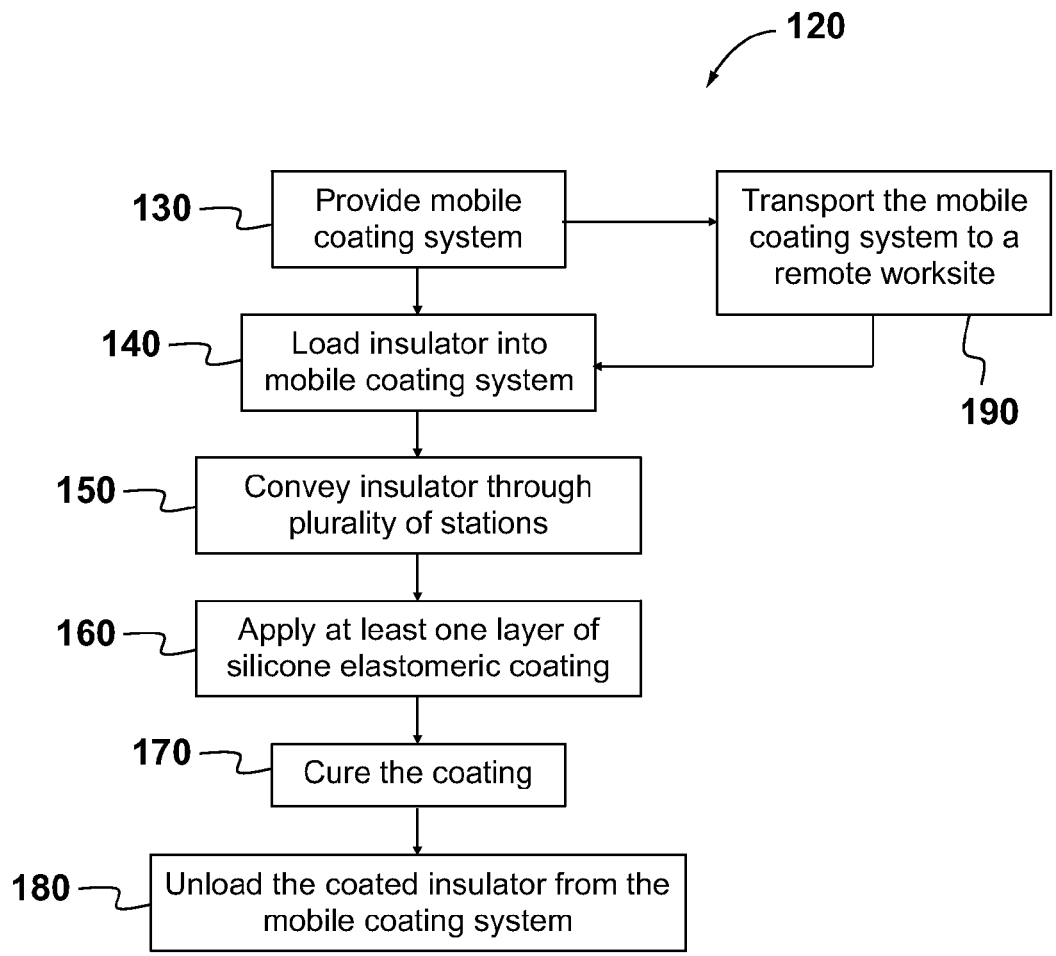
FIG. 6 is a flow chart showing a method of coating an electrical insulator according to another embodiment of the invention.

Referring now to FIG. 6, illustrated therein is a method 120 of coating an electrical insulator comprising steps 130, 140, 150, 160, 170, and 180.

Step 130 includes providing a mobile coating system, such as the mobile coating system 10. The mobile coating system may include a shipping container having a first end and a second end opposite to the first end, and a plurality of stations located within the shipping container. The shipping container may be the same or similar as the shipping container 12. The plurality of stations may include a coating station for applying an elastomeric coating to the insulator, and a curing station located after the coating station for curing the elastomeric coating.

Step 140 includes loading the insulator into the mobile coating system, for example, at the first end of the shipping container. More particularly, the insulator may be loaded into the rotatable couplers 50 at the rear end 42 of the shipping container 12.

Step 150 includes conveying the insulator through the plurality of stations along an elongated circular path within the shipping container. For example, the insulators may be conveyed using the endless loop conveyor 16.

Step 160 includes applying at least one layer of elastomeric coating to the insulator at the coating station, which may be the same or similar as the coating stations 26. As an example, the coating may be applied using a robotically controlled applicator such as the spray applicator 60 and the robot 62.

Step 170 includes curing the elastomeric coating on the coated insulated at the curing station, which may be the same or similar as the curing station 28.

Step 180 includes unloading the coated insulator from the mobile coating system, for example, at the first end of the shipping container.

In some embodiments, the method 120 may also include additional steps, such as step 190 of transporting the mobile spray system to a remote worksite, which may occur after step 130 and before step 140.

Referring now to FIGS. 7-11, illustrated therein is an applicator 200 for spraying an elastomeric material in accordance with an embodiment of the invention. The applicator 200 includes an applicator body 210, a nozzle 212 for spraying elastomeric material, a needle valve 214 for selectively allowing the spray of the elastomeric material out from the nozzle 212, and an air cap 216 for providing airflow so as to atomize the elastomeric material and provide a selected spray pattern. As indicated above, the applicator 200 may be used in combination with the mobile coating system 10.

Figure 7:
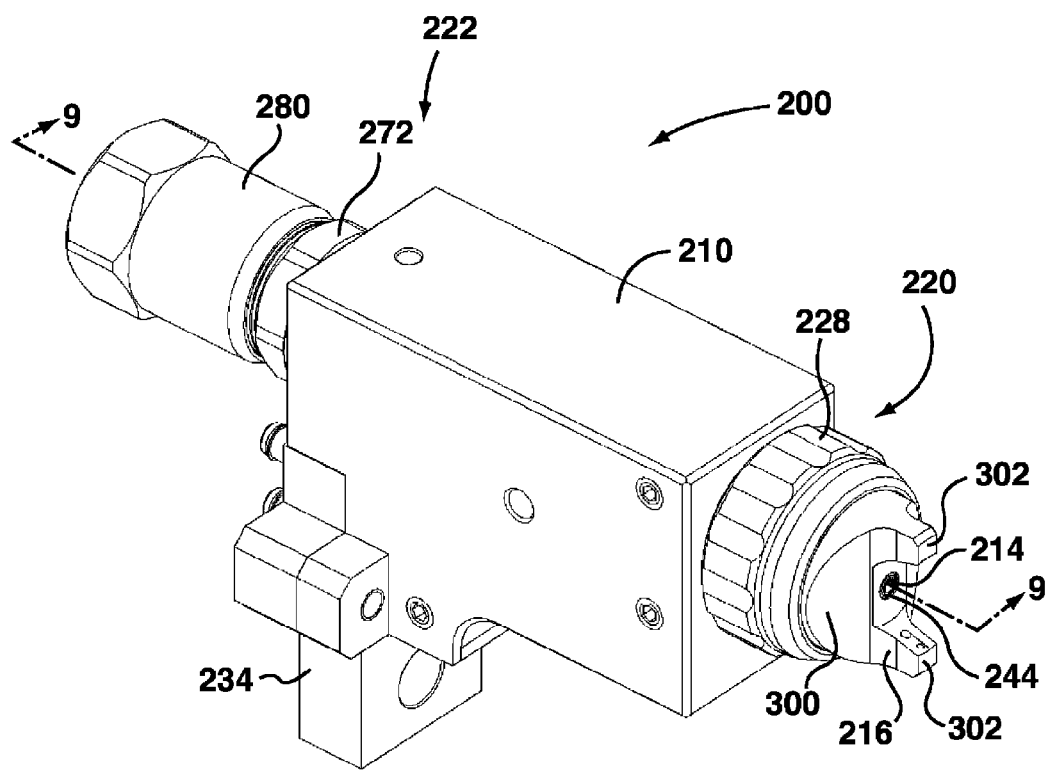
FIG. 7 is a perspective view of an applicator for spraying elastomeric material according to another embodiment of the invention.
Figure 8:
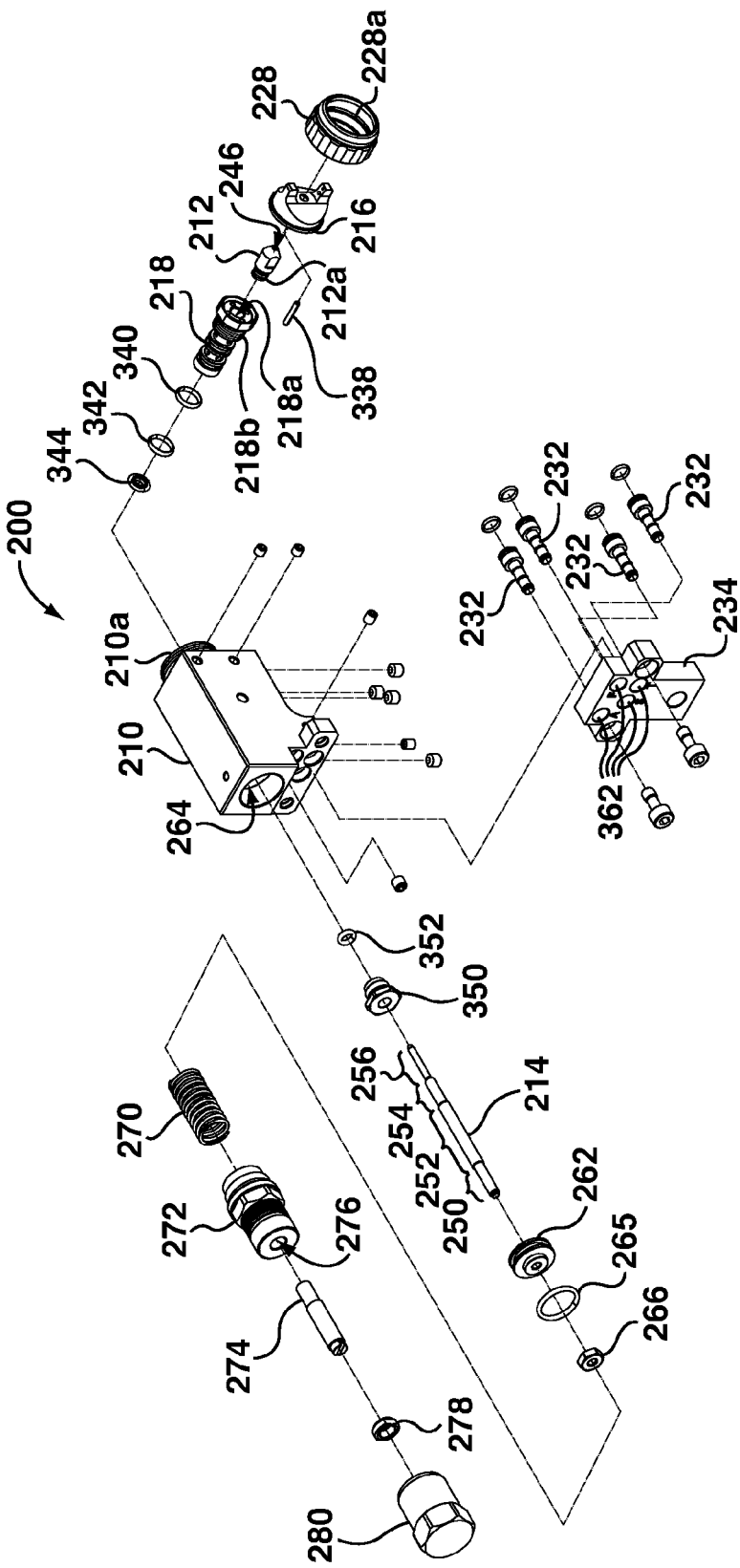
FIG. 8 is an exploded perspective view of the applicator of FIG. 7.
Figure 9:
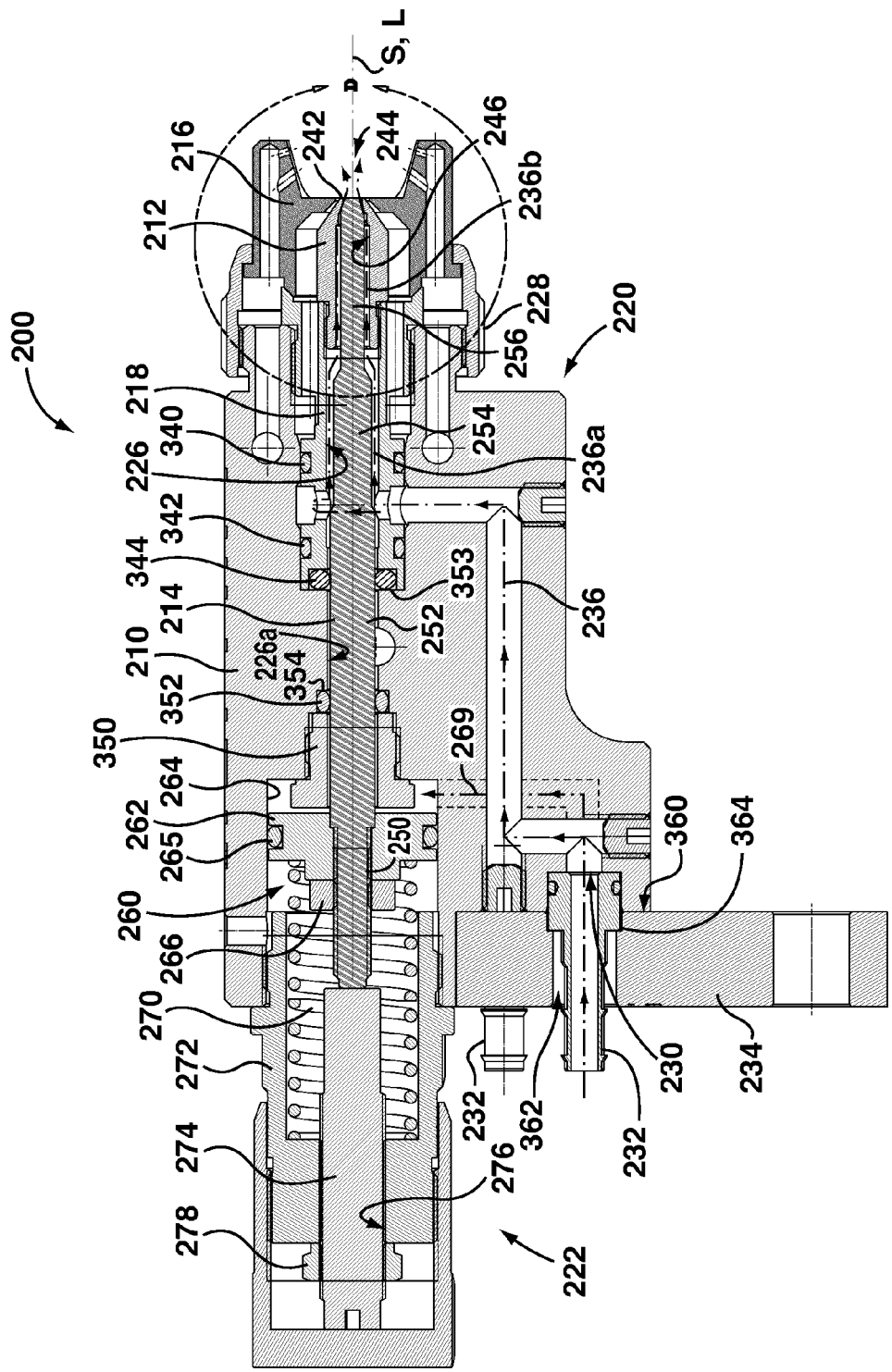
FIG. 9 is a cross-sectional view of the applicator of FIG. 7 along the line 9-9.

With reference to FIGS. 7-9, the applicator body 210 has a generally block-like shape with a front end 220 and a rear end 222. As shown in FIG. 9, an internal bore 226 extends through the applicator body 210 from the front end 220 to the rear end 222. The internal bore 226 is configured to receive the nozzle 212 and the needle valve 214.

Both the nozzle 212 and the air cap 216 are coupled to the front end 222 of the applicator body 210. For example, as shown in FIGS. 8 and 9, the nozzle 212 has a rear end with a male thread 212a, which screws into a corresponding female thread 218a on a cylindrical fluid distribution insert 218. The fluid distribution insert 218 has a middle portion with another male thread 218b, which screws into a corresponding female thread (not shown) on the internal bore 226 of the applicator body 210.

Figure 10:
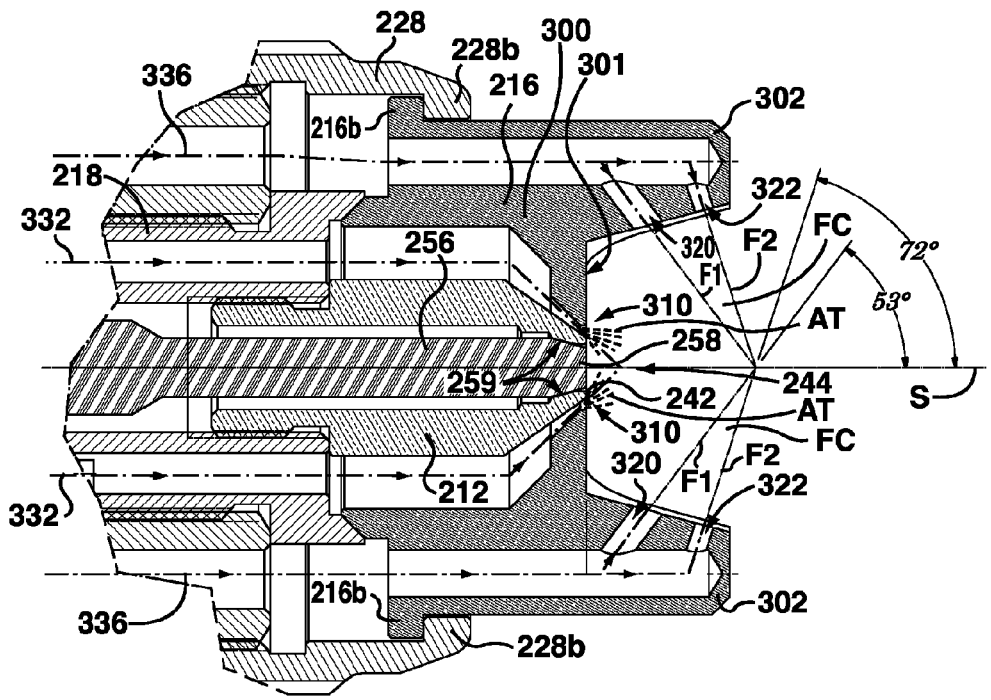
FIG. 10 is an enlarged cross-sectional view of the applicator of FIG. 9, which shows a nozzle and an air cap.

The air cap 216 partially covers the nozzle 212 and is secured in place by a retaining ring 228. The retaining ring 228 has an interior female thread 228a that screws onto a corresponding external male thread 210a on the front end 220 of the applicator body 210. As shown in FIG. 10, the retaining ring 228 has an interior circumferential rim 228b that engages a corresponding exterior circumferential flange 216b on the air cap 216 so as to secure the air cap 216 to the applicator body 210.

The threaded connections on the nozzle 212, fluid distribution insert 218 and retaining ring 228 allow easy assembly and disassembly of the nozzle 212 and the air cap 216, which may be desirable in order to clean the applicator 200.

In other embodiments, the nozzle 212 and the air cap 216 may be directly coupled to the applicator body 210 without using the fluid distribution insert 218 or the retaining ring 228. In such embodiments, the fluid distribution insert 218 may be integrally formed with the applicator body 210, for example, using manufacturing techniques such as 3D printing.

Figure 11:
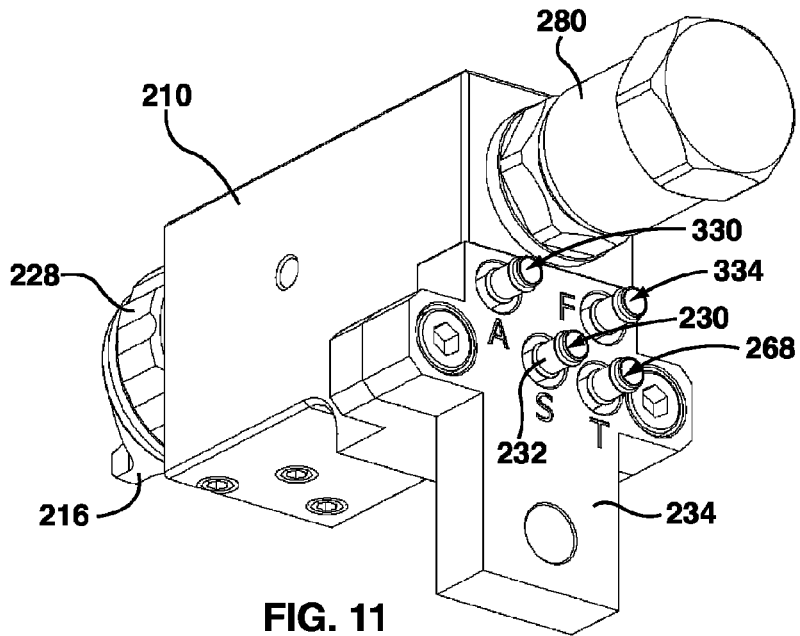
FIG. 11 is a rear perspective view of the applicator of FIG. 7.

As indicated above, the applicator 200 is configured to spray elastomeric materials, and in particular, silicone elastomeric materials such as a one component RTV silicone rubber. Accordingly, the applicator body 210 has a fluid inlet 230 for receiving a supply of elastomeric material, for example, from a storage container or another source of elastomeric material. As shown in FIGS. 9 and 11, the fluid inlet 230 is located on the rear end 222 of the applicator body 210 and may be connected to a supply line via a pipe fitting such as a barb 232. The barb 232 is held in place by a mounting plate 234 secured to the rear end 222 of the applicator body using fasteners such as bolts. In some embodiments, the fluid inlet 230 may have other locations, such as on the top, bottom or sides of the applicator body 210.

The nozzle 212 is configured to spray elastomeric material. In particular, the nozzle 212 has a discharge end 242 with a spray outlet 244 shaped to spray the elastomeric material along a spray axis S.

As shown in FIG. 9, the fluid inlet 230 is in fluid communication with the nozzle 212 via a fluid passageway (e.g. as indicated by the fluid flow path 236 lines), which allows elastomeric material to flow to the nozzle 212. For example, in the illustrated embodiment, the fluid passageway 236 extends from the fluid inlet 230, through the applicator body 210, to the internal bore 226, and then along both the needle valve 214 and the nozzle 212 toward the spray outlet 244. The portion of the fluid passageway 236 that extends along the needle valve 214 and the nozzle 212 is formed as an annular section. For example, the nozzle 212 has a nozzle bore 246 that cooperates with the needle valve 212 to define a portion of the annular section of the fluid passageway 236.

The needle valve 214 is slidably mounted within the internal bore 226 of the applicator body 210 for movement along a longitudinal axis L, which might be co-linear with the spray axis S as shown in the illustrated embodiment. In other embodiments, the longitudinal axis L and the spray axis S may be inclined and or offset from each other, for example, by tilting the nozzle 212 away from the longitudinal axis L.

The needle valve 214 is configured to move along the longitudinal axis L between a closed position for closing the fluid passageway 236, and an open position for opening the fluid passageway 236 so as to spray the elastomeric material from the spray outlet 244.

As shown in FIGS. 8 and 9, the needle valve 214 has an elongated cylindrical shape with a rear portion 250, a middle portion 252, a front portion 254, and a tip portion 256. These various portions are sized and shaped to allow smooth operation of the needle valve 214, and in particular, to maintain alignment of the needle valve 214 along the longitudinal axis L. The various portions of the needle valve 214 are also sized and shaped to prevent elastomeric material from becoming clogged within the fluid passageway 236.

The middle portion 252 generally has a larger diameter in comparison to the tip portion 256 and the front portion 254. The middle portion 252 is sized to fit into the internal bore 226 of the applicator body 210. In particular, the internal bore 226 has a middle section 226a with a diameter sized to slidably and supportably receive the middle portion 252 of the needle valve 214, which can help maintain alignment of the needle valve 214 along the longitudinal axis L.

The front portion 254 is of intermediate diameter compared to the middle portion 252 and the tip portion 256. Furthermore, the middle portion 252 has a smaller diameter than the internal bore 226 of the applicator body 210 and is sized to be received within a corresponding internal bore through the fluid distribution insert 218. More particularly, the front portion 254 has a smaller diameter than the internal bore through the fluid distribution insert 218 so as to define a first annular section 236a of the fluid passageway 236, which allows elastomeric material to flow around the needle valve 214 and to the nozzle 212. In some embodiments, the middle portion 252 may have an outer diameter of about 4.0 millimeters, and the internal bore through the fluid distribution insert 218 may have an inner diameter of about 5.5 millimeters. Accordingly, the first annular section 236a may have a cross-sectional area of about 11.2 mm$^2$. In other embodiments, the cross-section area of the first annular section 236a may have other shapes and sizes, which might be between about 5 mm$^2$ and about 20 mm$^2$.

The tip portion 256 has a diameter smaller than the front portion 254. The tip portion 256 is sized to be received within the nozzle bore 246. More particularly, the tip portion 256 has a smaller diameter than the nozzle bore 246 so as to define a second annular section 236b of the fluid passageway 236, which allows elastomeric material to flow from the first annular section 236a and out through the spray outlet 244. In some embodiments, the tip portion 256 may have an outer diameter of about 2.5 millimeters, and the nozzle bore 246 may have an inner diameter of about 3.6 millimeters. Accordingly, the first annular section 236a may have a cross-sectional area of about 5.1 mm$^2$. In other embodiments, the cross-section area of the first annular section 236a may have other shapes and sizes, which might be between about 2 mm$^2$ and about 10 mm$^2$.

As shown, the tip portion 256 and the nozzle bore 246 may be tapered radially inward toward the spray outlet 244. For example, the nozzle bore 246 may reduce to an inner diameter of about 2.0 millimeters. Accordingly, the cross-section area of the fluid passageway 236 at the spray outlet 244 may be about 3.1 mm$^2$. In other embodiments, the cross-section area of the fluid passageway 236 at the spray outlet 244 may have other shapes and sizes, which may be at least about 1.8 mm$^2$ (e.g. a nozzle diameter of at least 1.5 millimeters). Below this size, the applicator 200 may clog, or the flow of elastomeric material may be too low.

The tip portion 256 is generally shaped to extend through the nozzle 212 so as to be substantially flush with the discharge end 242 when the needle valve 214 is in the closed position. More particularly, with reference to FIG. 10, the tip portion 256 has a frustoconical end 258 configured to be substantially flush with the discharge end 242 when the needle valve 214 is in the closed position. In this manner, the frustoconical end 258 also tends to push excess elastomeric material out of the nozzle when the needle valve 214 closes, which may reduce clogging of the nozzle 212.

For greater certainty, the frustoconical end 258 may be recessed slightly or may protrude slightly from the discharge end 242 while still being "substantially flush". For example, the frustoconical end 258 may be recessed by up to about 1-millimeter, or may protrude up to about 3-millimeters from the discharge end 242.

As shown in FIG. 10, the frustoconical end 258 is shaped to abut against an annular interior ridge 259 of the nozzle 212 when the needle valve 214 is in the closed position. The abutment between the frustoconical end 258 and the interior ridge 259 tends to close and seal the fluid passageway 236, which inhibits the release of elastomeric material from the spray outlet 244.

In some embodiments, the seal within the fluid passageway 236 may be formed at other locations and with other parts of the applicator 200. For example, the seal may be formed between the front portion 254 of the needle valve 214 and the internal bore through the fluid distribution insert 218. Providing the seal further upstream from the spray outlet 244 can provide a physical trigger delay between the provision of atomizing air and the release of elastomeric material. The physical trigger delay can help ensure atomizing air is present prior to releasing elastomeric material, which can be particularly beneficial for applicators with manual spray triggers.

Referring again to FIGS. 8 and 9, movement of the needle valve 214 between the open and closed positions is controlled by a trigger, such as an air trigger 260. As shown, the air trigger 260 includes a piston 262 slidably received within a piston chamber 264 formed at the rear end 222 of the applicator body 210 (e.g. as a cylindrical bore). The piston 262 is configured to reciprocate back and forth within the piston chamber 264. A sealing member 265 such as an O-ring provides a seal between the piston 262 and the piston chamber 264.

The piston 262 is coupled to the rear portion 250 of the needle valve 214 such that reciprocation of the piston 262 within the piston chamber 264 moves the needle valve 214 between the open and closed positions. The piston 262 may be coupled to the needle valve 214 using a fastener such as a nut 266 that threads onto a corresponding threaded section of the rear portion 250 of the needle valve 214.

The air trigger 260 is actuated by a trigger airflow. For example, as shown in FIG. 11, the applicator 200 includes a trigger airflow inlet 268 for supplying the trigger airflow to the piston chamber 264 via a trigger airflow passageway 269 (a portion of which is shown in FIG. 9). The trigger airflow inlet 270 may be located on the rear end 222 of the applicator body 210 and may be similar to the fluid inlet 230.

The air trigger 260 also includes a biasing element for biasing the needle valve 214 toward the closed position. As shown in FIG. 9, the biasing element includes a spring 270 seated between the rearward side of the piston 262 and an end cap 272. The end cap 272 screws into the rear end 222 of the applicator body 210. The end cap 272 has a cylindrical cavity sized and shaped to receive and support the spring 270 along the longitudinal axis L, which tends to keep the spring 270 aligned with the needle valve 214.

In use, the trigger airflow enters the piston cylinder 264 on the front side of the piston 262. Thus, the trigger airflow pushes the piston 262 rearward, which pulls the needle valve 214 rearward toward the open position so as to spray elastomeric material from the spray outlet 244. When the trigger airflow is stopped, the spring 270 biases the needle valve 214 back toward the closed position, which stops the spray of elastomeric material.

As shown in FIGS. 8 and 9, the applicator 200 may include an adjustable trigger so as to permit adjustment of the open and closed positions for the needle valve 214. For example, in the illustrated embodiment, the air trigger 260 includes a needle stop 274 received through a longitudinal bore 276 in the end cap 272. The needle stop 274 is longitudinally aligned with the needle valve 214 so as to set a travel length for the needle valve 214 between the open and closed positions. Both the needle stop 274 and the bore 276 have corresponding threads, which allows adjustment of the travel length. The position of the needle stop 274 can be secured by a fastener such as a lock nut 278 threaded onto the needle stop 274 rearward of the end cap 272. A rear cover 280 screws onto the rear end of the end cap 272 so as to cover the needle stop 274 and the lock nut 278.

While the illustrated embodiment includes an adjustable trigger, in other embodiments the trigger may have other configurations, and in particular, the trigger may not be adjustable. For example, the end cap 272 may incorporate an integral backstop with a fixed position instead of the adjustable needle stop 274. The use of a backstop having a fixed position can help prevent alterations or tampering of the travel length for the needle valve 214.

Referring now to FIGS. 7 and 10, the air cap 216 will be described in greater detail. The air cap 216 includes a base portion 300 and a two diametrically opposed horns 302 projecting forwardly from the base portion 300. The base portion 300 is coupled to the front end 220 of the applicator body 210, for example, using the retaining ring 228 as described above. The base portion 300 has a front face 301 that is substantially flush with the discharge end 242 of the nozzle 212.

As indicated previously, the air cap 216 is configured to provide an atomizing airflow AT and a fan control airflow FC. The atomizing airflow AT atomizes the elastomeric material being sprayed out the nozzle 212, while the fan control airflow FC provides a selected spray pattern for the elastomeric material being sprayed.

As shown in FIG. 10, the air cap 216 has a plurality of airflow outlets for providing the atomizing airflow AT and the fan control airflow FC. In particular, the air cap 216 has an atomizing airflow outlet 310 on the base portion 300 for providing the atomizing airflow AT, and two sets of fan control airflow outlets 320, 322 on the horns 302 for providing the fan control airflow FC.

The atomizing airflow outlet 310 is located on the base portion 300 adjacent to the spray outlet 244 of the nozzle 212. More particularly, the atomizing airflow outlet 310 is defined by an aperture in the base portion 300 that forms an annular gap between the nozzle 212 and the base portion 300 of the air cap 216. In some embodiments, the annular gap may have an annular thickness of between about 1-millimeter and about 3-millimeters. Providing an annular gap of this size may reduce the likelihood of elastomeric material clogging the annular outlet 310.

In some embodiments, the atomizing airflow outlet 310 may have other configurations. For example, the air cap 216 may have a set of apertures distributed circumferentially around the spray outlet 244 so as to define the atomizing airflow outlet 310. Furthermore, in some embodiments, the air cap 216 may include both an annular gap and the set of apertures around the spray outlet 244.

As indicated above, the air cap 216 includes two sets of fan control airflow outlets 320, 322 located on the horns 302. In particular, a first set of airflow outlets 320 are located on the horns closer to the base portion 300, and a second set of airflow outlets are located on the horns 302 forwardly relative to the first set of fan control airflow outlets 320.

The first set of fan control airflow outlets 320 directs a first portion of the fan control airflow FC along a first direction F1. Similarly, the second set of fan control airflow outlets 322 directs a second portion of the fan control airflow FC along a second direction F2. In the illustrated embodiment, the first direction F1 is about 53-degrees from the spray axis S, and the second direction F2 is about 72-degrees from the spray axis S.

In some embodiments, the outlets 320 and 322 may be directed along other directions. For example, the first direction F1 may be between about 40-degrees and 65-degrees from the spray axis S, and the second direction F2 may be between about 60-degrees and 85-degrees from the spray axis S.

The airflows from the fan control outlets 320 and 322 are directed so as to meet along the spray axis S. In particular, the airflow from the first set of fan control airflow outlets 320 meets at a first focus along the spray axis S, and the airflow from the second set of fan control airflow outlets 322 meets at a second focus along the spray axis S. As shown, both the first and second foci are located forwardly of the air cap 216. More particularly, the first focus and the second focus are conterminous in the sense that they are located in the same generally position along the spray axis S. In other embodiments, the first and second foci may be separate and distinct from each other.

Providing the first and second foci forwardly of the air cap 216, and in particular, forwardly of the front tips of the horns 302 can reduce the likelihood of elastomeric material being sprayed onto the air cap 216, which might otherwise clog the air cap 216. In some embodiments, the foci may be at least about 2-millimeters in front of the horns 302. This configuration has been found to help to minimize clogging while still providing a selected spray pattern, for example, so as to enhance transfer efficiency.

As shown, the first and second foci are also located forwardly of a focus point for the atomizing airflow AT. Configuring the fan control airflow outlets 320 and 322 in this manner can also help reduce clogging of the air cap 216 and can help provide a high transfer efficiency. The increase in transfer efficiency may be based on the following theory as understood by the inventors.

The inventors understand that some elastomeric materials, such as one component room temperature vulcanizable (RTV) silicone rubber, include long chain polymers entangled together. The inventors further understand that the long chain polymers may need to be untangled in order to form fine droplets prior to being shaped into a selected spray pattern. Focusing the atomizing airflow rearward of the focus point(s) for the fan control airflow FC is believed to help untangle the long chain polymers prior to being shaped into a selected spray pattern, particularly when spraying the elastomeric material at low pressures, as will be described further below.

While one configuration of the fan control airflow outlets has been described, in other embodiments the fan control airflow outlets may have other configurations. For example, the air cap 216 may include four horns distributed circumferentially around the nozzle 212, and each horn may have one airflow outlet. Furthermore, the airflow outlets on opposed horns may be aligned along different directions, such as the first and second directions F1 and F2.

In order to provide the atomizing airflow AT and the fan control airflow FC, the applicator 200 has one or more airflow inlets. For example, as shown in FIG. 11, the applicator 200 includes an atomizing airflow inlet 330 located at the rear end 222 of the applicator body 210 for providing the atomizing airflow AT via an atomizing airflow passageway 332 (shown in FIG. 10). The atomizing airflow passageway 332 extends through the applicator body 210, through a number of distribution ports in the fluid distribution insert 218, and to the air cap 216.

Similarly, the applicator 200 also has a fan control inlet 334 located at the rear end 222 of the applicator body 210 for providing the fan control airflow FC via a fan control airflow passageway 336 (shown in FIG. 10). The fan control airflow passageway 336 extends through the applicator body 210 and to the air cap 216.

Both the atomizing airflow inlet 330 and the fan control airflow 334 inlet may be similar to the fluid inlet 230. For example, both airflow inlets 330 and 334 can be connected to supply lines via barbs 232 that extend through the mounting plate 234.

Providing separate inlets for the atomizing airflow AT and fan control airflow FC allows independent control of air pressure for each airflow. For example, the atomizing airflow AT may be provided at an air pressure of between about 10 psi and about 90 psi, and the fan control airflow FC may be provided at an air pressure of between about 5 psi and about 85 psi.

In other embodiments, the applicator 200 may have a single airflow inlet for providing both the atomizing airflow AT and the fan control airflow FC at the same air pressure. Furthermore, in other embodiments, the airflow inlet(s) may have other locations, such as being located directly on the air cap 216.

In some embodiments the air cap 216 may include a positioning device such as a poka-yoke pin 338 for positioning the air cap 216 on the applicator body 210. More particularly, the applicator body 210 may have an aperture (not shown) for receiving the poka-yoke pin 338 so as to position the air cap 216 in a particular orientation. In some embodiments, the applicator body 210 may include a number of apertures for receiving the poka-yoke pin 338 such that the air cap 216 can be positioned in a number of orientations, for example, in a first position, and a second position that is orthogonal to the first position.

As indicated above, the fluid distribution insert 218 distributes the atomizing airflow AT to the air cap 216 and also defines a portion of the fluid passageway for distributing elastomeric material to the spray outlet 244. In addition to distributing airflow and elastomeric material, the fluid distribution insert 218 also isolates the fluid passageway 236 from both the trigger airflow passageway 272 and the atomizing airflow passageway 332. In particular, as shown in FIGS. 8 and 9, the fluid distribution insert 218 includes three sealing members, namely, two O-rings 340 and 342, and a rod seal 344. The front O-ring 340 provides a seal between the fluid passageway 236 and the atomizing airflow passageway 332, while the rear O-ring 342 and the rod seal 344 provide seals between the fluid passageway 236 and the trigger airflow passageway 272.

With respect to the rod seal 344, the applicator body 210 has a front internal flange 353 forward of the middle section 226a of the internal bore 226 shaped to engage the rod seal 344. Threading the fluid distribution insert 218 into the internal bore 226 compresses the rod seal 344 against the front interior flange 353 so as to provide a seal between the applicator body 210 and the needle valve 214.

The applicator 200 also includes a throat seal member 350 rearward of the middle section 226a of the internal bore 226 for providing an additional seal between the fluid passageway 236 and the trigger airflow passageway 272. The throat seal member 350 is a cylindrical member having a bore that slidably receives the needle valve 214 therethrough. Furthermore, the throat seal member 350 has exterior threads that screw into the backside of the internal bore 226 so as to compress a sealing member such as an O-ring 352 between the needle valve 214 and the applicator body 210. More particularly, the applicator body 210 has a rear internal flange 354 rearward of the middle section 226a of the internal bore 226 for receiving the O-ring 352. Compressing the O-ring 352 against the flange 354 provides a seal between the needle valve 214 and the applicator body 210.

In some embodiments, the O-rings 340, 342, 344 and 352 may be made from a chemically resistant material such as Viton®, Teflon® and so on. Materials such as Viton® also tend to minimize swelling of seals, which can reduce wear and increase lifespan.

In addition to providing seals, both the fluid distribution insert 218 and the throat seal member 350 act as supporting members that support and align the needle valve 214 within the internal bore 226. Maintaining alignment of the needle valve 214 can help provide smooth operation of the applicator 200, particularly when spraying elastomeric materials.

As described above, the applicator 200 also includes a mounting plate 234. The mounting plate 234 can be used to removably fasten the applicator body 210 to a robot, such as one of the robots 62 described above.

The mounting plate 234 also allows connection of one or more supply lines to the applicator 200. In particular, with reference to FIG. 9, the mounting plate 234 has an interior mounting surface 360 configured to abut the rear end 222 of the applicator body 210 around the fluid inlet 230, the trigger airflow inlet 270, the atomizing airflow inlet 330, and the fan control airflow inlet 334. The mounting plate 234 also has four ports 362 (shown in FIG. 8). Each port 362 receives a corresponding supply line for the elastomeric material, the trigger airflow, the atomizing airflow AT, and the fan control airflow FC. As shown in FIG. 9, each port 362 also has an embossment 364 adjacent the interior mounting surface 360. The embossment 364 forms a stepped edge for receiving a barb 232 of one of the corresponding supply lines. Accordingly, the barbs are held between the mounting plate 234 and the applicator body 210. This helps provide a more secure connection with the supply line.

The use of the mounting plate 234 also enables a user to quickly remove the supply lines by unscrewing the mounting plate 234 from the applicator body 210. This can be helpful if the applicator 200 were to clog, in which case it may be desirable to install a standby replacement applicator so as to continue spraying elastomeric material while cleaning or repairing the first applicator.

The mounting plate 234 also helps to reinforce the supply lines. In particular, when a supply line such as a plastic tube is attached to the barb 232, the portion of the supply line that goes over the barb is also surrounded by the mounting plate 234. Thus, the mounting plate tends to reinforce this portion of the supply line, which increases the burst strength of the supply line. This can be particularly helpful because conventional supply lines have been known to burst around the barbs.

In some embodiments, one or more of the applicator body 210, the nozzle 212, the fluid passageway 236, the needle valve 214, and the air cap 216 may be configured to spray elastomeric materials, particularly at low pressure. For example, the particular configuration of the applicator body 210, the nozzle 212, the fluid passageway 236, the needle valve 214, and the air cap 216 as described above has been found to enable the applicator 200 to spray elastomeric materials at low pressures. In particular, the applicator 200 as described above has been found to spray elastomeric materials effectively when supplied to the fluid inlet 230 at a low pressure of less than about 250 psi, or more particularly a low pressure of less than about 60 psi, or more particularly still, a low pressure of less than about 30 psi. Accordingly, in some embodiments, the fluid inlet 230 may be adapted to receive a supply of elastomeric material at these low pressures.

The applicator 200 described above has been found to operate particularly well when spraying elastomeric materials. In particular, the applicator 200 has been found to spray silicone elastomeric materials with a transfer efficiency of up to about 95%, particularly when supplying the silicone elastomeric material at the low pressures described above, and when using the mobile coating system 10 described above.

The inventors believe that the increased transfer efficiency might be a result of enabling long chain polymers to untangle when ejecting the elastomeric material from the spray outlet at low pressures. In contrast, conventional spraying techniques have attempted to spray elastomeric materials at higher pressures, for example, based on the viscous nature of elastomeric materials.

The inventors believe that spraying at lower pressure might decrease particle velocity of the elastomeric materials, which might result in better adherence and better ability to shape the spray pattern so as to achieve higher transfer efficiencies and less wasted product. Lower pressure can also reduce shearing of the elastomeric material so as to provide sag resistance. In contrast, high pressures might shear the elastomeric material and cause the coating to sag or drip once applied to the insulator.

What has been described is merely illustrative of the application of the principles of the embodiments. Other arrangements and methods can be implemented by those skilled in the art without departing from the spirit and scope of the embodiments described herein.

The invention claimed is:

1. A method of applying a silicone elastomeric coating, the method comprising spraying a silicone elastomeric material onto an electrical insulator that is for use on high-voltage power transmission lines, the silicone elastomeric material being sprayed using an applicator comprising:
  (a) an applicator body having a front end, a rear end, an internal bore, and a fluid inlet for receiving a supply of the silicone elastomeric material;
  (b) a nozzle coupled to the front end of the applicator body, the nozzle having a discharge end with a spray outlet in fluid communication with the fluid inlet via a fluid passageway, the spray outlet being shaped to spray the silicone elastomeric material along a spray axis;
  (c) a needle valve slidably mounted within the internal bore for movement along a longitudinal axis between a closed position for closing the fluid passageway and an open position for opening the fluid passageway so as to spray the silicone elastomeric material; and
  (d) an air cap coupled to the front end of the applicator body adjacent the nozzle, the air cap having at least one airflow inlet for receiving a supply of air and a plurality of airflow outlets for providing:
    (i) an atomizing airflow so as to atomize the silicone elastomeric material being sprayed; and
    (ii) a fan control airflow so as to provide a selected spray pattern for the silicone elastomeric material being sprayed.

2. The method of claim 1, wherein the needle valve has a tip portion shaped to extend through the nozzle so as to be substantially flush with the discharge end of the nozzle when the needle valve is in the closed position.

3. The method of claim 1, further comprising supplying the silicone elastomeric material at a low pressure of less than about 250 psi.

4. A method of applying a silicone elastomeric coating, the method comprising:
  (a) supplying a silicone elastomeric material to a spray applicator at a low pressure of less than about 250 psi; and
  (b) spraying the silicone elastomeric material onto an electrical insulator that is for use on high-voltage power transmission lines, the silicone elastomeric material being sprayed at the low pressure using the applicator.

5. The method of claim 4, wherein the silicone elastomeric material is a one component room temperature vulcanizable (RTV) silicone rubber.

6. The method of claim 1, wherein the silicone elastomeric material is a one component room temperature vulcanizable (RTV) silicone rubber.

7. The method of claim 1, wherein the plurality of airflow outlets on the air cap includes at least one atomizing airflow outlet for providing the atomizing airflow, and at least one fan control outlet for providing the fan control airflow.

8. The method of claim 7, wherein the atomizing airflow outlet is located adjacent the spray outlet of the nozzle for providing the atomizing airflow.

9. The method of claim 8, wherein the air cap has a base portion with a front face substantially flush with the discharge end of the nozzle, and wherein the atomizing airflow outlet is located on the base portion.

10. The method of claim 9, wherein the atomizing airflow outlet is defined by an annular gap between the nozzle and the base portion.

11. The method of claim 10, wherein the annular gap has an annular thickness of between about 1-millimeter and about 3-millimeters.

12. The method of claim 7, wherein the at least one fan control outlet includes:
  (a) a first set of fan control airflow outlets for directing a first portion of the fan control airflow along a first direction so as to meet at a first focus along the spray axis; and
  (b) a second set of fan control airflow outlets for directing a second portion of the fan control airflow along a second direction so as to meet at a second focus along the spray axis.

13. The method of claim 12, wherein both the first focus and the second focus are located forwardly of the air cap.

14. The method of claim 13, wherein the first focus and the second focus are conterminous.

15. The method of claim 12, wherein the air cap includes a base portion coupled to the front end of the applicator body and a set of horns projecting forwardly from the base portion, and wherein the first and second sets of fan control airflow outlets are located on the set of horns.

16. The method of claim 15, wherein the second set of fan control airflow outlets are located on the set of horns forwardly relative to the first set of fan control airflow outlets.

17. The method of claim 1, wherein the at least one airflow inlet includes an atomizing airflow inlet for providing the atomizing airflow and a fan control airflow inlet for providing the fan control airflow.

18. The method of claim 2, wherein the tip portion of the needle valve has a frustoconical end configured to be substantially flush with the discharge end of the nozzle when the needle valve is in the closed position.

19. The method of claim 1, wherein the applicator further comprises at least one supporting member for maintaining alignment of the needle valve within the internal bore.

20. The method of claim 1, wherein the applicator further comprises a mounting plate for removably fastening the applicator body to a robot, the mounting plate having:
  (a) an interior mounting surface configured to abut the applicator body; and
  (b) a plurality of ports for receiving a plurality of supply lines, the supply lines including a fluid supply line for supplying the silicone elastomeric material to be sprayed and at least one air supply line for supplying the air for the atomizing airflow and the fan control airflow, wherein each port includes a embossment adjacent the interior mounting surface for receiving a barb of a corresponding supply conduit.

* * * * *